United States Patent [19]

Niihara et al.

[11] Patent Number: 4,889,835
[45] Date of Patent: Dec. 26, 1989

[54] SIC-AL$_2$O$_3$ COMPOSITE SINTERED BODIES AND METHOD OF PRODUCING THE SAME

[75] Inventors: Koichi Niihara; Atsushi Nakahira, both of Yokosuka, Japan

[73] Assignee: NGK Insulators, Ltd., Nagaya, Japan

[21] Appl. No.: 246,801

[22] Filed: Sep. 20, 1988

[30] Foreign Application Priority Data

Sep. 30, 1987 [JP] Japan ................ 62-244158

[51] Int. Cl.$^4$ .............. C04B 35/10; C04B 35/80
[52] U.S. Cl. .......................... 501/89; 501/95; 501/128
[58] Field of Search .................. 501/89, 95, 128

[56] References Cited

U.S. PATENT DOCUMENTS

| | | | |
|---|---|---|---|
| 4,543,345 | 9/1986 | Wei | 501/89 X |
| 4,652,413 | 3/1987 | Tiegs | 501/89 X |
| 4,657,877 | 4/1987 | Becher et al. | 501/89 |
| 4,745,091 | 5/1988 | Landingham | 501/98 |
| 4,746,635 | 5/1988 | Inoue et al. | 501/89 |

FOREIGN PATENT DOCUMENTS

| | | | |
|---|---|---|---|
| 0039766 | 3/1984 | Japan | 501/89 |
| 1021964 | 1/1986 | Japan | 501/89 |
| 1021965 | 1/1986 | Japan | 501/89 |

Primary Examiner—William R. Dixon, Jr.
Assistant Examiner—Karl Group
Attorney, Agent, or Firm—Arnold, White & Durkee

[57] ABSTRACT

SiC-Al$_2$O$_3$ composite sintered bodies having high strength and toughness are constructed by dispersing SiC particle and SiC whisker into a matrix of Al$_2$Ohd 3 particles.

8 Claims, 2 Drawing Sheets

FIG_1
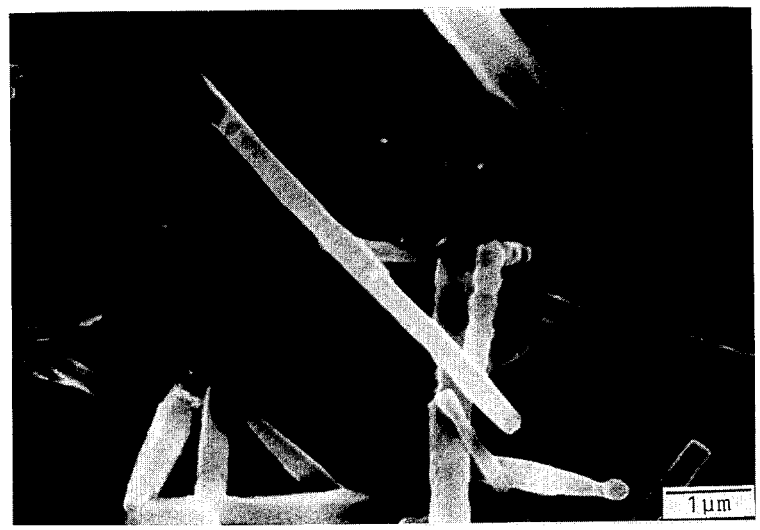
FIG_2
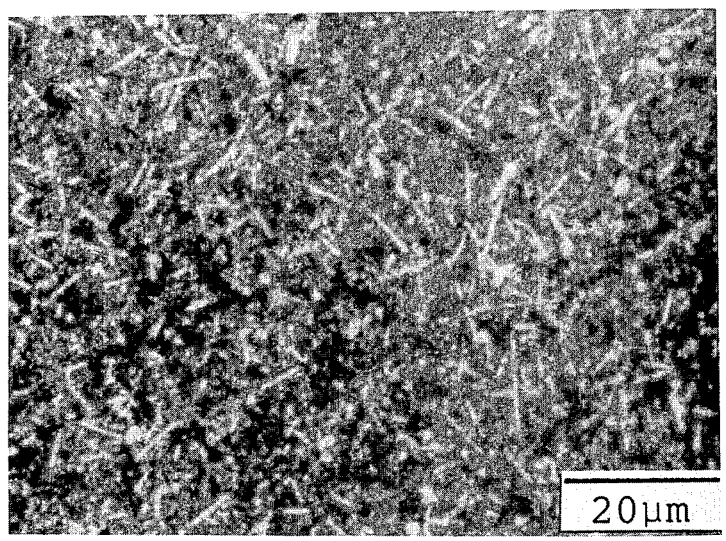

FIG_3
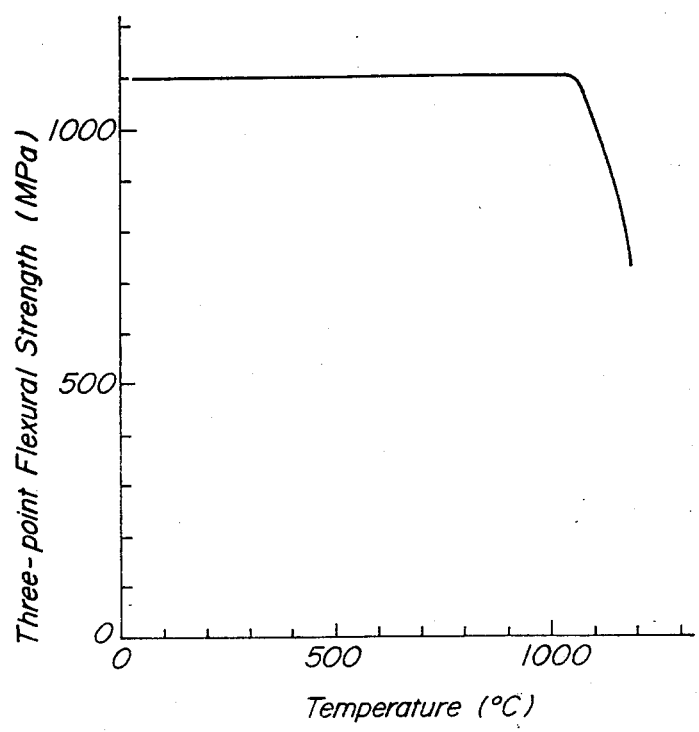

SIC-AL$_2$O$_3$ COMPOSITE SINTERED BODIES AND METHOD OF PRODUCING THE SAME

BACKGROUND OF THE INVENTION

1. Field of the Invention

This invention relates to SiC-Al$_2$O$_3$ composite sintered bodies and a method of producing the same, and more particularly to SiC-Al$_2$O$_3$ composite sintered bodies suitable for use in structural materials having high strength and toughness and a method of producing the same.

2. Related Art Statement

Al$_2$O$_3$ is widely used as a substrate or a package for a integrated circuit, a chip for cutting tool or a refractory material. However, the strength and toughness of Al$_2$O$_3$ are low as compared with those of a silicon nitride sintered body, so that there is a restriction in the use as a structural material for engine parts and the like.

In order to increase the strength and toughness of Al$_2$O$_3$, it has been proposed to disperse SiC particles or SiC whiskers into the Al$_2$O$_3$ matrix. For example, the increase of the toughness in the Al$_2$O$_3$ sintered body through the dispersion of SiC whiskers is disclosed in American Ceramics Society Bulletin, 64 [2], 298–304 (1985). Furthermore, the increase of the strength, toughness and hardness and the improvement of high temperature properties in the Al$_2$O$_3$ sintered body through the dispersion of SiC particles are disclosed in Japanese Patent laid open No. 59-3,766, No. 61-21,964 and No. 61-174,165.

However, when only SiC whiskers are dispersed into the Al$_2$O$_3$, matrix the sinterability of Al$_2$O$_3$ is considerably damaged, and also the firing at a high temperature for a long time is required for the densification. For this end, SiC grains grow in the Al$_2$O$_3$ sintered body to increase the toughness, but the strength undesirably lowers. On the other hand, the dispersion of SiC particles can not increase the toughness as compared with the case of dispersing SiC whiskers.

SUMMARY OF THE INVENTION

It is, therefore, an object of the invention to solve the aforementioned drawbacks of the conventional technique and provide an SiC-Al$_2$O$_3$ composite sintered body, having an Al$_2$O$_3$ sintered body containing SiC whiskers and SiC particles dispersed therein, wherein growth of Al$_2$O$_3$ grains is suppressed and the toughness is increased without lowering the strength. Another object of the present invention relates to a method of producing the above-discussed SiC Al$_2$O$_3$ composite sintered body.

According to a first aspect of the invention, there is the provision of an SiC-Al$_2$O$_3$ composite sintered body, characterized in that 2–20 mol% of SiC grains having a grain size of not more than 1 $\mu$m and 2–20 mol% of SiC whiskers having a diameter range of 0.5–5 $\mu$m and an aspect ratio of not less than 3 are dispersed in said sintered body and a matrix thereof consists of $\alpha$-Al$_2$O$_3$ grains having a grain size of not more than 5 $\mu$m.

According to a second aspect of the invention, there is provided a method of producing SiC-Al$_2$O$_3$ composite sintered bodies, which comprises shaping a mixed powder comprising 2–20 mol% of SiC particles having a particle size of not more than 1 $\mu$m and 2–20 mol% of SiC whisker having a diameter range of 0.5–5 $\mu$m and an aspect ratio of not less than 3, and the remainder being Al$_2$O$_3$ powder having a particle size of not more than 2 $\mu$m, and then sintering the shaped mixed powder at 1,400°–1,800° C.

BRIEF DESCRIPTION OF THE DRAWINGS

The invention will be described with reference to the accompanying drawings, wherein:

FIG. 1 is a microphotograph showing a particle structure of SiC whisker;

FIG. 2 is a microphotograph showing a particle structure of the SiC-Al$_2$O$_3$ composite sintered body according to the invention; and FIG. 3 is a graph showing a temperature change of strength in Example 1 of the SiC-Al$_2$O$_3$ composite sintered body according to the invention.

DESCRIPTION OF THE PREFERRED EMBODIMENTS

In the SiC-Al$_2$O$_3$ composite sintered body according to the invention, SiC grains or SiC whiskers are existent at the grain boundary of $\alpha$-Al$_2$O$_3$ grains or existent in the grains. The amount of SiC grains included in the sintered body is 2–20 mol%, because when the amount is less than 2 mol%, the microstructure of Al$_2$O$_3$ grains, such as grains size or the like, can not be controlled during the sintering and the grain size of Al$_2$O$_3$ grains becomes large to lower the strength of the sintered body. Conversely when the amount exceeds 20 mol%, the densification of Al$_2$O$_3$ is obstructed during the sintering and a dense sintered body can not be obtained. Preferably, the amount of SiC grains is 5–10 mol%. On the other hand, the amount of SiC whiskers is 2–20 mol%, because when the amount is less than 2 mol%, the distribution of SiC whiskers in the sintered body is insufficient to prevent cracking and the effect of increasing the toughness is substantially zero. Conversely, when the amount exceeds 20 mol%, the densification of Al$_2$O$_3$ is obstructed and a dense sintered body can not be obtained. Preferably, the amount of SiC whiskers is 5–15 mol%.

The grains sizes of $\alpha$-Al$_2$O$_3$ grains and SiC grains and the diameter range and aspect ratio of SiC whiskers are determined by observing the microstructure of a surface of the sintered body which has been cut, polished and etched. The grain size of SiC grains is not more than 1 $\mu$m, because when it exceeds 1 $\mu$m, if SiC grains are large at its starting material, the densification of Al$_2$O$_3$ is obstructed and the dense sintered body is not obtained. Further, if SiC grains largely grow during the sintering, Al$_2$O$_3$ grains also grow in the sintering to lower the strength of the sintered body. On the other hand, with regard to the SiC whiskers, it is necessary to have a diameter range of 0.5–5 $\mu$m and an aspect ratio of not less than 3. When the diameter is less than 0.5 $\mu$m, the action of the whiskers in preventing crack growth is lost and the toughness is not increased. Conversely, when the diameter range exceeds 5 $\mu$m, the densification of Al$_2$O$_3$ is obstructed and the dense sintered body is not obtained, or the whisker itself acts as a breaking source to lower the strength of the sintered body. Further, when the aspect ratio is less than 3, the action of the whisker preventing the crack growth is lost in the breakage of the sintered body and the toughness is not increased. Preferably, the diameter range and the aspect ratio are 1–5 $\mu$m and not less than 3, respectively.

In the SiC-Al$_2$O$_3$ composite sintered body according to the invention, the toughness is increased without lowering the strength by the action of the SiC whiskers preventing crack growth in the breakage and the action of microstructure control owing to the presence of the SiC grains during the sintering.

The production of the SiC-Al$_2$O$_3$ composite sintered body according to the invention will be described in detail below.

The particle size of Al$_2$O$_3$ powder as a starting material is preferably not more than 2 μm as a size corresponding to specific surface area. When it exceeds 2 μm, the sinterability is poor and the densification is difficult, and if it is intended to conduct the densification at a high temperature, Al$_2$O$_3$ particles grow in the sintered body to lower the strength of the sintered body. Preferably, the particle size of Al$_2$O$_3$ powder is not more than 0.5 μm. As the starting Al$_2$O$_3$ powder, γ-Al$_2$O$_3$ or the like may be used if it is converted into α-Al$_2$O$_3$ after the firing. The Al$_2$O$_3$ powder is preferable to have a high purity because the impurity particularly degrades the high temperature properties. Particularly, it is favorable to use Al$_2$O$_3$ powder having a purity of not less than 99%.

The particle size of SiC particle is preferable to be not more than 0.5 μm as a size corresponding to a specific surface area. When it exceeds 0.5 μm, SiC particles do not sufficiently disperse into Al$_2$O$_3$ particles and the microstructure such as the grain size of Al$_2$O$_3$ grains or the like during the sintering can not be controlled and consequently the strength of the resulting sintered body lowers. Particularly, the particle size of SiC particle is favorable to be not more than 0.2 μm. Further, SiC particle may have α type or β type.

The short size and aspect ratio of SiC whiskers are measured by a scanning type electron microscope and are preferable to be 0.5-5 μm and not less than 3, respectively, because SiC whiskers are difficult to grow during sintering. Particularly, SiC whiskers are favorable to have a diameter range of 1-5 μm and an aspect ratio of not less than 1.

It is preferred that the SiC particles or SiC whiskers have a high purity, because the impurity particularly degrades the high temperature properties. Preferably, the SiC particles should not contain a metal impurity of more than 1% and an oxygen content of more than 1%. Moreover, SiO$_2$ or the like inevitably included from the SiC particles or SiC whiskers may form a different phase in the grain boundary between α-Al$_2$O$_3$ grains or the like.

The above Al$_2$O$_3$ powder, SiC particles and SiC whiskers are mixed to obtain a mixed powder for shaping. The mixing is carried out under a wet or dry type by means of a ball mill or the like. Since the oxidation of the SiC particles or SiC whiskers, or the breakage of the SiC whiskers may result during the mixing, it is necessary to determine the mixing process while observing the state of the mixed powder. As the mixing process, Al$_2$O$_3$ powder is thoroughly mixed with SiC particles and then mixed with SiC whiskers under a relatively unpulverizable condition. The resulting mixed powder is shaped into a desired form by dry pressing, injection molding or the like. Moreover, SiC whiskers can be oriented during the shaping to give an anisotropy inherent to the form.

The shaped body made from the mixed powder of Al$_2$O$_3$ powder, SiC particles and SiC whiskers is densified by pressureless sintering, hot pressing, hot isostatic pressing (HIP) or the like. In this case, it is necessary to set the firing conditions so that the grain size of SiC particles is not more than 1 μm, the diameter range and aspect ratio of the SiC whiskers are 0.5-5 μm and not less than 3, respectively, and the grain size of the α-Al$_2$O$_3$ grains is not more than 5 μm in the resulting sintered body. For this purpose, the firing temperature is 1,400°-1,800° C. When the firing temperature is lower than 1,400° C., the densification is insufficient, while when it is higher than 1,800° C., the growth of the Al$_2$O$_3$ and SiC grains and the reaction between Al$_2$O$_3$ and SiC are caused and consequently, the SiC-Al$_2$O$_3$ composite sintered body consisting of Al$_2$O$_3$ grains as a matrix and dispersed SiC grains and SiC whiskers according to the invention can not be obtained. The firing atmosphere may be an inert atmosphere such as nitrogen, argon or the like, or a reducing atmosphere such as hydrogen or the like for preventing the oxidation of the SiC grains and SiC whiskers. Moreover, the SiC whiskers can be oriented to give an anisotropy to the sintered body by the hot pressing. As the hot isostatic pressing, there may be preformed a method wherein a presintered body having less open pores is previously produced by the pressureless pressing or the hot pressing and then subjected to the hot isostatic pressing, or a method wherein the shaped body is airtightly sealed with a metal, glass or the like and then subjected to the hot isostatic pressing.

The following examples are given in illustration of the invention and are not intended as limitations thereof.

α-Al$_2$O$_3$ powder having an average particle size of 0.2 μm and a purity of 99.9%, β-SiC particle having an average particle size of 0.2 μm and a purity of 98%, and SiC whisker having a diameter range of 0.1-2 μm, an aspect ratio of not less than 5 and a purity of 97% were mixed at a mixing ratio as shown in the following Table 1 in a polyethylene container containing iron balls each coated with polyethylene under a wet state of acetone for 10 hours. A scanning type electron microphotograph of the SiC whiskers was shown in FIG. 1. The thus obtained mixed powder was previously shaped into a size of 50 mm in diameter and 10 mm in thickness and pressed under a pressure of 200 MPa. The shaped body was then hot pressed at a temperature shown in Table 1 under a pressure of 30 MPa to obtain SiC-Al$_2$O$_3$ composite sintered bodies of Examples 1-5 according to the invention. Further, the same procedure as mentioned above was repeated except that the mixing ratio was outside the range defined in the invention to obtain the composite sintered bodies of Comparative Examples 6-9. All of these sintered bodies had a porosity of not more than 1% and were dense.

In Examples 1-5 and Comparative Examples 6-9, the composition of the sintered body was coincident with that of the mixed powder as a result of crystal quantification through chemical analysis and X-ray diffraction. An optical microphotograph of the polished surface of the sintered body in Example 1 was shown in FIG. 2, wherein a white portion denotes SiC grains or SiC whiskers and a black portion denotes the Al$_2$O$_3$ matrix. The grain size of Al$_2$O$_3$ particle and SiC particle in Examples 1-5 and Comparative Examples 6-9 was measured by optical microscope and scanning type electron microscope to obtain results as shown in Table 1. Moreover, the diameter range and aspect ratio of the SiC whiskers in the sintered body were the same as in the starting SiC whiskers.

Furthermore, In Examples 1-5 and Comparative Examples 6-9, the three-point flexural strength at room temperature was measured according to a method of JIS R1601 and the fracture toughness value ($K_{IC}$) was measured according to an indentation fracture method to obtain results as shown in Table 1. Moreover, FIG. 3 shows the temperature change of three-point flexural strength in the sintered body of Example 1 when this strength was measured over a temperature range of from room temperature to 1,400° C.

TABLE 1

| No. | Composition of mixed powder (mol %) | | | Firing temperature (°C.) | Grain size of sintered body (μm) | | Three-point flexural strength (MPa) | $K_{IC}$ (MPam$^{0.5}$) |
|---|---|---|---|---|---|---|---|---|
| | α-Al$_2$O$_3$ | SiC particle | SiC whisker | | Al$_2$O$_3$ grain | SiC grain | | |
| Example | | | | | | | | |
| 1 | 80 | 10 | 10 | 1600 | <3 | <0.5 | 1100 | 5.8 |
| 2 | 78 | 2 | 20 | 1600 | <5 | <0.5 | 1030 | 5.3 |
| 3 | 78 | 20 | 2 | 1700 | <3 | <0.5 | 980 | 5.4 |
| 4 | 80 | 5 | 15 | 1800 | <4 | <0.5 | 1060 | 5.7 |
| 5 | 85 | 10 | 5 | 1400 | <3 | <0.5 | 1080 | 5.9 |
| Comparative Example | | | | | | | | |
| 6 | 84 | 1 | 15 | 1500 | <12 | <1.2 | 420 | 5.4 |
| 7 | 89 | 10 | 1 | 1800 | <3 | <0.5 | 650 | 4.5 |
| 8 | 70 | 5 | 25 | 1400 | <3 | <0.5 | 550 | 5.6 |
| 9 | 70 | 25 | 5 | 1500 | <3 | <0.5 | 720 | 4.2 |

As seen from the above results, the SiC-Al$_2$O$_3$ composite sintered bodies according to the invention have a three-point flexural strength of not less than 980 MPa and a toughness $K_{IC}$ of not less than 5.3 MPam$^{0.5}$, which are higher than those of the comparative examples, and are excellent in the high temperature properties up to 1,000° C.

As mentioned above, the SiC-Al$_2$O$_3$ composite sintered bodies according to the invention have a strength of not less than 980 MPa and $K_{IC}$ of not less than 5.3 MPam$^{0.5}$ by the action of the SiC whiskers preventing crack growth in the breakage of the sintered body and the action of the SiC grains controlling the microstructure in the sintering, and thus, the sintered bodies are suitable as a structural material. Furthermore, they are applicable to a high-temperature structural material such as engine parts or the like because they are excellent in the high temperature properties up to 1,000° C.

What is claimed is:

1. An SiC-Al$_2$O$_3$ composite sintered body, consisting essentially of:
   a matrix phase consisting of Al$_2$O$_3$ grains having a grain size of not greater than 5 μm;
   2-20 mol% SiC grains having a grain size of not greater than 1 μm; and
   2-20 mol% SiC whiskers having a diameter range of 0.5-5 μm and an aspect ratio of not less than 3.

2. The composite sintered body of claim 1, wherein said SiC whiskers are present in an amount of 5-15 mol%.

3. The composite sintered body of claim 1, wherein said SiC whiskers have a diameter range of 1-5 μm.

4. The composite sintered body of claim 1, wherein said Al$_2$O$_3$ consists of α-Al$_2$O$_3$.

5. The composite sintered body of claim 1, wherein said sintered composite body has a three-point flexural strength of not less than 980 MPa.

6. The composite sintered body of claim 1, wherein said sintered composite body has a toughness ($K_{IC}$) of not less than 5.3 MPam$^{0.5}$.

7. An SiC-Al$_2$O$_3$ composite sintered body, consisting essentially of:
   a matrix phase consisting of Al$_2$O$_3$ grains having a grain size of not greater than 5 μm;
   5-10 mol% SiC grains having a grain size of not greater than 1 ∞m; and
   2-20 mol% SiC whiskers having a diameter range of 0.5-5 μm and an aspect ratio of not less than 3;
   wherein said body has a three-point flexural strength of not less than 980 MPa and a toughness ($K_{IC}$) of not less than 5.3 MPam$^{0.5}$.

8. The composite sintered body of claim 7, wherein said Al$_2$O$_3$ consists of α-Al$_2$O$_3$.

* * * * *